United States Patent
Zogg et al.

(10) Patent No.: US 11,650,833 B1
(45) Date of Patent: May 16, 2023

(54) SYSTEMS AND METHODS FOR AUTOMATICALLY GENERATING GUIDED USER INTERFACES (GUIS) FOR TRACKING AND MIGRATING LEGACY NETWORKED RESOURCES WITHIN AN ENTERPRISE DURING A TECHNICAL MIGRATION

(71) Applicant: STATE FARM MUTUAL AUTOMOBILE INSURANCE COMPANY, Bloomington, IL (US)

(72) Inventors: Jason Zogg, Bloomington, IL (US); Lakshmi Devi Boreddy, Bloomington, IL (US); D. Michael George, Hopedale, IL (US); Krishnamurthi Ramasamy, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 612 days.

(21) Appl. No.: 16/743,870

(22) Filed: Jan. 15, 2020

(51) Int. Cl.
  *G06F 16/21* (2019.01)
  *G06F 9/451* (2018.01)
  *H04L 41/22* (2022.01)

(52) U.S. Cl.
  CPC ............ *G06F 9/453* (2018.02); *G06F 16/212* (2019.01); *G06F 16/214* (2019.01); *H04L 41/22* (2013.01)

(58) Field of Classification Search
  CPC ...... G06F 9/453; G06F 16/212; G06F 16/214; G06F 9/455; H04L 41/22
  See application file for complete search history.

(56) References Cited

U.S. PATENT DOCUMENTS 7,580,862 B1 * 8/2009 Montelo ................ G06Q 10/10
                                                            705/26.1
8,893,118 B2   11/2014 Guminy et al.
(Continued)

FOREIGN PATENT DOCUMENTS

CN      104252502 A    12/2014
CN      104408085 A     3/2015
CN      107992512 A     5/2018

OTHER PUBLICATIONS

Datadobi, "DobiMiner White Paper—NAS Storage Platform Migration", Retrieved from the Internet at: <URL: https://datadobi.com/whitepapers/DobiMigrate_Whitepaper.pdf> (2018).

(Continued)

*Primary Examiner* — Phenuel S Salomon
(74) *Attorney, Agent, or Firm* — Marshall, Gerstein & Borun LLP

(57) ABSTRACT

Automated migration systems and methods are described for generating guided user interfaces (GUIs) for tracking migrating legacy networked resources within a computer network environment during a technical migration. The automated migration systems and methods include loading, by a dashboard tracking application (app) implemented on a migration server according to first and second migration schema formats, into a migration database each of first and second reporting data and first and second tracking data corresponding to first and second legacy networked resources as tracked during an active migration session. The dashboard tracking app receives, during the active migration session, a dashboard request for graphical status of each of the first and second legacy networked resources, and automatically generates a tracking GUI rendering first and second statutes of the first and second legacy networked (Continued)

resources based on the first and second reporting data and the first and second tracking data.

20 Claims, 10 Drawing Sheets

(56) References Cited

U.S. PATENT DOCUMENTS

| | | |
|---|---|---|
| 9,098,364 B2 | 8/2015 | Davis |
| 9,282,166 B2 | 3/2016 | Markley et al. |
| 9,875,276 B2 | 1/2018 | Golec et al. |
| 9,996,562 B2 | 6/2018 | Higginson et al. |
| 10,248,671 B2 | 4/2019 | Buehne et al. |
| 10,311,078 B2 | 6/2019 | Bryan et al. |
| 2009/0222413 A1* | 9/2009 | Mattox ................. G06F 16/214 |
| 2012/0203823 A1* | 8/2012 | Manglik ............. H04L 67/1014 709/203 |
| 2016/0036724 A1 | 2/2016 | Syed et al. |
| 2016/0094624 A1* | 3/2016 | Mordani ................. H04L 67/02 709/203 |
| 2016/0112510 A1* | 4/2016 | Bai ..................... G06F 9/45558 709/217 |
| 2016/0212222 A1* | 7/2016 | Bultema ............. H04L 41/5058 |
| 2016/0292206 A1* | 10/2016 | Ruiz Velazquez .... G06F 16/258 |
| 2018/0019928 A1* | 1/2018 | Firment .............. G06F 11/3006 |
| 2019/0235895 A1 | 8/2019 | Ovesea et al. |

OTHER PUBLICATIONS

Hwang et al., "Automation and orchestration framework for large-scale enterprise cloud migration", *IBM Journal of Research and Development*, 60(2-3), 1-12 (2016).

* cited by examiner

200 ──▶ (Example Migration Query)

Q New Search                                                                    Save As ∨  Close 202 ── | inputlookup was_crmt | search host-"*P7ECS*" OR EAR-"*P7ECS*" OR HostGroup-"*P7ECS*" OR Pod-"*P7ECS*" OR Pool-"* P7ECS*" OR VIP-"* P7ECS*" OR Blueprint-"* P7ECS*" OR Realn-"* P7ECS*" | sort by host Pool |       Last 15 minutes ∨  🔍

✓ 0 events (7/23/19 6:50:12.000 AM to 7/23/19 7:05:12.000 AM)          Job ∨ ‖ ☐ ↗ ↧       ⚡Fast Mode ∨

Events | Patterns | Statistics (1,301)s | Visualization

20 Per Page ∨   Format ∨   Preview ∨                                  ⟨ Prev  [1] 2 3 4 5 6 7 8 9  Next ⟩

| AppName ⇅ | AppVersion ⇅ | Blueprint ⇅ | ContextRoot ⇅ | CreationDate ⇅ | CurrentState ⇅ | EAR ⇅ | Heap ⇅ | HostGroup ⇅ | HostsinPool ⇅ | MinorEnv ⇅ | NamedEnv ⇅ | Pod ⇅ | Pool ⇅ |
|---|---|---|---|---|---|---|---|---|---|---|---|---|---|
| ECSOnline P7ECSC01 | 38.0.073 | WAS 8.5 r19.2 (EG1256) | /ccs/ | 2019-06-17T10:31:01.000 | backout | P7ECSC01 | 4096 | - | 5 | production | | Standard-CLAIMSPPV | SFSTANDARD-CLAIMSPPV-APP-PROD-BZE EDCR-LTUCD0060004 1-50000-POOL |
| 212 | | | 212c | | | | | | | | | | |
| ECSOnline P7ECSC01 | 38.0.073 | WAS 8.5 r19.2 (EG1256) | /ccs/ | 2019-06-17T10:31:01.000 | backout | P7ECSC01 | 4096 | - | 5 | production | | Standard-CLAIMSPPV | SFSTANDARD-CLAIMSPPV-APP-PROD-BZE EDCR-LTUCD0060004 1-50000-POOL |
| ECSOnline P7ECSC01 | 38.0.073 | WAS 8.5 r19.2 (EG1256) | /ccs/ | 2019-06-17T10:31:01.000 | backout | P7ECSC01 | 4096 | - | 5 | production | | Standard-CLAIMSPPV | SFSTANDARD-CLAIMSPPV-APP-PROD-BZE EDCR-LTUCD0060004 1-50000-POOL |
| ECSOnline | 38.0.073 | WAS 8.5 | /ccs/ | 2019-06- | backout | P7ECSC01 | 4096 | - | 5 | production | | Standard- | SFSTANDARD- |

FIG. 2A (Resource Dependencies - Database)

| ear ⇅ | db_host ⇅ | db_name ⇅ | db_name ⇅ | db_port ⇅ | db_type ⇅ |
|---|---|---|---|---|---|
| P7ECSC01 | E21IBMVIPA1.OPR.STATEFARM.ORG | | 58 | 3160 | IMS |
| P7ECSC01 | E26IBMVIPA1.OPR.STATEFARM.ORG | | 58 | 3160 | IMS |
| P7ECSC01 | EP5IBMVIPA.OPR.STATEFARM.ORG | | 58 | 3160 | IMS |
| P7ECSC01 | SQLPSSSS1.OPR.STATEFARM.ORG | SFSQL_SESSIONSTATE | 8 | 1433 | SQL |
| P7ECSC01 | E20IBMVIPA1.OPR.STATEFARM.ORG | | 58 | 3160 | IMS |
| P7ECSC01 | E11IBMVIPA1.OPR.STATEFARM.ORG | | 58 | 3160 | IMS |
| P7ECSC01 | E09IBMVIPA1.OP.STATEFARM.ORG | | 58 | 3160 | IMS |
| P7ECSC01 | E17IBMVIPA1.OPR.STATEFARM.ORG | | 58 | 3160 | IMS |
| P7ECSC01 | E01IBMVIPA1.OPR.STATEFARM.ORG | | 58 | 3160 | IMS |
| P7ECSC01 | E05IBMVIPA1.OPR.STATEFARM.ORG | | 58 | 3160 | IMS |

(Resource Dependencies - Mainframe)

280 →

| protocol | Ear | local_location | local_os | conn_type | remote_location | remote_prefix_desc | remote_server_type | remote_os | conn_count |
|---|---|---|---|---|---|---|---|---|---|
| tcp | P7ECS* | Olathe | Linux | inbound | Unknown | Load Balancer Appliance | Unknown | Unknown | 176577 |
| tcp | P7ECS* | Olathe | Linux | outbound | Olathe | Performance Tools | HP Diagnostics/None/None | Linux | 75001 |
| tcp | P7ECS* | Olathe | Linux | outbound | Unknown | Unknown | Unknown | Unknown | 46806 |
| tcp | P7ECS* | Olathe | Linux | outbound | Olathe | Splunk data search software | Splunk/None/None | Linux | 26777 |
| tcp | P7ECS* | Olathe | Linux | outbound | EDCO(31) | Windows | Directory Services/AD Domain Controller/None | WS12 R2 | 16094 |
| tcp | P7ECS* | Olathe | Linux | outbound | Olathe | LifeCycle Tools | LifeCycle Tools/IBM UrbanCode/None | Linux | 15603 |
| tcp | P7ECS* | Olathe | Linux | outbound | Unknown | log-linux | Unknown | Unknown | 15519 |
| tcp | P7ECS* | Olathe | Linux | outbound | Unknown | Mainframe | Unknown | Unknown | 6722 |
| tcp | P7ECS* | Olathe | Linux | outbound | Unknown | Domain Name System (DNS) | Unknown | Unknown | 2053 |
| tcp | P7ECS* | Olathe | Linux | outbound | Unknown | puppet-std-prod-edco | Unknown | Unknown | 1110 |
| tcp | P7ECS* | Olathe | Linux | outbound | Unknown | Enterprise System Center (Command Center) | Unknown | Unknown | 416 |
| tcp | P7ECS* | Olathe | Linux | outbound | Unknown | b2emstriscc | Unknown | Unknown | 285 |
| tcp | P7ECS* | Olathe | Linux | outbound | ISC East | Enterprise System Center (Command Center) | OpenView/None/None | Linux | 206 |
| tcp | P7ECS* | Olathe | Linux | outbound | Unknown | sp-spkds-lb-prod-edco | Unknown | Unknown | 190 |
| tcp | P7ECS* | Olathe | Linux | outbound | Richardson | Performance Tools | Best1/None/None | Linux | 145 |
| tcp | P7ECS* | Olathe | Linux | inbound | Richardson | Performance Tools | Best1/None/None | Linux | 143 |

(Migration Schema – IAAS Migration)

IAAS Migration

MST_IAAS_PV_SERVER_STATUS_MAPPING

| Field | Type | Null | Key | Default | Extra |
|---|---|---|---|---|---|
| VAR_TEAM_NAME | varchar(500) | YES | | | |
| VAR_SERVER_NAME | varchar(500) | YES | UNI | | |
| VAR_SERVER_TYPE | varchar(700) | YES | | | |
| VAR_BUSINESS_AREA | varchar(700) | YES | | | |
| VAR_SERVER_LOCATION | varchar(500) | YES | | | |
| VAR_MICRO_STATUS | varchar(200) | YES | | | |
| VAR_PV_STATUS_BY_SRV | varchar(200) | YES | | | |
| VAR_ASSESMENT_START_DATE | varchar(50) | YES | | | |
| VAR_ASSESMENT_COMPLETE_DATE | varchar(50) | YES | | | |
| VAR_ENV_READY_DATE | varchar(50) | YES | | | |
| VAR_MIGRATION_COMPLETE_DATE | varchar(50) | YES | | | |
| VAR_RTS_COMPLETE_DATE | varchar(50) | YES | | | |
| VAR_REMARKS | mediumtext | YES | | | |
| VAR_SIZE | varchar(50) | YES | | | |
| VAR_IDX_TYPE | varchar(45) | YES | | | |
| UNQ_TRACKER_ID | int(11) unsigned | NO | PRI | | auto_increment |

(Migration Schema – Windows 2012 Sunset)

| Windows 2012 Sunset TXN_WINIAAS_SRV_MIG ||||||
|---|---|---|---|---|---|
| Field | Type | Null | Key | Default | Extra |
| UNQ_TRACKER_ID | int(11) | NO | PRI | | auto_increment |
| SERVER_ENVRMNT | varchar(100) | YES | | | |
| SERVER_NAME | varchar(200) | YES | | | |
| SERVER_TYPE | varchar(500) | YES | | | |
| DOMAIN_NAME | varchar(500) | YES | | | |
| OPERATING_SYSTEM | varchar(500) | YES | | | |
| HARDWARE_TYPE | varchar(500) | YES | | | |
| HOST_GROUP | varchar(200) | YES | | | |
| LOCATION | varchar(100) | YES | | | |
| PRIMARY_CONTACT | varchar(50) | YES | | | |
| SECONDARY_CONTACT | varchar(50) | YES | | | |
| TERTIARY_CONTACT | varchar(50) | YES | | | |
| GOVERNING_SERVICE | varchar(500) | YES | | | |
| BUSINESS_AREA | varchar(500) | YES | | | |
| WORKGROUP | varchar(100) | YES | | | |
| MIGRATION_STATUS | varchar(200) | YES | | | |
| REQ_DUE_DTT | varchar(50) | YES | | | |
| FA_BUILD_START_DTT | varchar(50) | YES | | | |
| FA_BUILD_CMPLT_DTT | varchar(50) | YES | | | |
| FB_BUILD_START_DTT | varchar(50) | YES | | | |
| FB_BUILD_CMPLT_DTT | varchar(50) | YES | | | |
| PROD_BUILD_START_DTT | varchar(50) | YES | | | |
| PROD_BUILD_CMPLT_DTT | varchar(50) | YES | | | |
| CUTOVER_DTT | varchar(50) | YES | | | |
| RTS_DTT | varchar(50) | YES | | | |
| FOLLOWUP_DTT | varchar(50) | YES | | | |
| REMARKS | mediumtext | YES | | | |
| X_DEPENDENCY | varchar(45) | YES | | | |
| FK_SERVER_TYPE_ID | int(11) | YES | MUL | | |

FIG. 3B

(Tracking - GUI)

Status by Server Count as of 7/22/2019 — 422

| Status | Not-Started | In-Progress | Complete | Total |
|---|---|---|---|---|
| 01-Pre-Assessment | 58 | 2629 | 7057 | 9744 |
| 02-Iaas Steps In-Progress | 2687 | 39 | 7018 | 9744 |
| 03-Ready to Deploy | 2726 | 1627 | 5391 | 9744 |
| 04-Build & Test | 4353 | 3320 | 2071 | 9744 |
| 05-Migration/Cut-Over | 7673 | 5 | 2066 | 9744 |
| 06-RTS Complete | 7678 | 1021 | 1045 | 9744 |

Server Count

| Date | Status | Count |
|---|---|---|
| 7/22/2019 | Not Started | 58 |
| | Pre-Assessment | 2629 |
| | Iaas Steps In-Progress | 39 |
| | Ready to Deploy | 1627 |
| | Build & Test | 3320 |
| | Migration/Cut-Over | 5 |
| | Marked for RTS | 1021 |
| | RTS Complete | 1045 |
| | Grand Total | 9744 |

IaaS Migration Dashboard Glossary

Status by Server Type Count as of 7/22/2019 — 424

| Status | Not-Started | In-Progress | Complete | Total |
|---|---|---|---|---|
| 01-Pre-Assessment | 17 | 120 | 172 | 309 |
| 02-Iaas Steps In-Progress | 137 | 5 | 167 | 309 |
| 03-Ready to Deploy | 142 | 10 | 157 | 309 |
| 04-Build & Test | 152 | 81 | 76 | 309 |
| 05-Migration/Cut-Over | 233 | 2 | 74 | 309 |
| 06-RTS Complete | 235 | 40 | 34 | 309 |

Server Type Count

| Date | Status | Count |
|---|---|---|
| 7/22/2019 | Not Started | 17 |
| | Pre-Assessment | 120 |
| | Iaas Steps In-Progress | 5 |
| | Ready to Deploy | 10 |
| | Build & Test | 81 |
| | Migration/Cut-Over | 2 |
| | Marked for RTS | 40 |
| | RTS Complete | 34 |
| | Grand Total | 309 |

FIG. 4B

(Migration Search Screen)

MSATT (Migration Services Assets Tracking Tool)

Welcome Dylan

Database refined search filter has two options:
Server Type name - is a suggested search and auto fills options based on the text entered
Search By Field - allows for search by specific data
General Search Type - allows for general search of the table

Server name - when selected leads to an information page on the server with all collected details to be easily updated.

Server Type Name [Type here...] — 502

Search By Field [-Select- ▼] [Search] Clear/Reset

Migration Server Details — 504

[Search here....]

| | Server Type | Server Name | Micro Status | PV Status(S) |
|---|---|---|---|---|
| ☐ | | ag29db01 | Step 4.1 - Server builds | Build & Test |
| ☐ | Access Governance/None/None | ag29p001 | Step 4.1 - Server builds | Build & Test |
| ☐ | Access Governance/None/None | ag29p0011 | Step 4.1 - Server builds | Build & Test |

SYSTEMS AND METHODS FOR AUTOMATICALLY GENERATING GUIDED USER INTERFACES (GUIS) FOR TRACKING AND MIGRATING LEGACY NETWORKED RESOURCES WITHIN AN ENTERPRISE DURING A TECHNICAL MIGRATION

CROSS REFERENCE TO RELATED APPLICATIONS

The present disclosure is also related to co-owned U.S. patent application Ser. No. 16/743,835, filed concurrently herewith and entitled "Systems And Methods For Automated Discovery And Tracking Of A Migration Of Legacy Networked Resources Within An Enterprise," the entire disclosure(s) of which are incorporated by reference herein.

FIELD OF THE DISCLOSURE

The present disclosure generally relates automated technical migration systems and methods, and, more particularly, to automated migration systems for generating guided user interfaces (GUIs) for tracking migrating legacy networked resources within a computer network environment of an enterprise during a technical migration.

BACKGROUND

Technical migration involves the transition of one technical platform or asset to another. A technical migration typically involves the upgrade of older hardware or software of an older technical platform to newer software or hardware of a newer technical platform. A technical migration may be undertaken because the older software or hardware has ended its shelf-life, is no longer supported by the manufacturer, or is otherwise no longer useful. For example, the older software or hardware may have served the needs of the company employing the older hardware or software. While the older hardware or software is typically removed or deleted, technical migrations generally seek to maintain useful assets of, or used by, an old technical platform for use with the new technical platform.

Problems can arise, however, during a technical migration due to different formats, protocols, security concerns, or other differences between the technology of older platforms and the technology of newer platforms. While transitioning a few assets of a small platform can be difficult in and of itself, transitioning many assets, such as several hundred or thousands of assets, of a larger system can be taken years of planning and implementation. For example, a large-scale migration involving many systems, software applications, or assets can take years of planning and implementation in order to successfully accomplish. Migration difficulties can be greater where a completely redesigned technical environment and/or new technology or platform is brought into an existing technical environment, creating difficulties of merging connections, data, or other requirements of the old and new platform.

For these reasons, technical migrations, especially large-scale technical migrations, typically experience high error rates and/or at least a decrease capabilities or performance of the new technical platform, as bugs or other errors or exceptions may be experienced by newer technologies that rely on older assets that were not correctly migrated. In such large-scale migrations, various assets from different areas of a network, and in many instances as operated and/or maintained by different stakeholders of a given company or technical environment, need to be identified and transitioned by teams of individuals. This typically increases the complexity and timing of the technical migration. Teams of individuals are generally required to maintain and track progress separately, typically via simple electronic or paper documents. Such activity limits the ability of a migration team to realize an extensive report or overview of a technical migration for a given technical platform and any business area that relies upon it.

For the foregoing reasons, there is a need for automated migration systems and methods for generating guided user interfaces (GUIs) for tracking migrating legacy networked resources within a computer network environment during a technical migration.

BRIEF SUMMARY

The embodiments of the disclosure herein relates to automated tracking and migration of technical platforms. The automated systems and methods described herein, regarding discovering and tracking a migration of legacy networked resources within a computer network environment, may be referred to, or belong as group to, a Migration Services Asset Tracking Tool (MSATT), or MSATT toolkit, providing solutions for all migration activities of a technical migration whether small or large scale. In various embodiments, the automated systems and methods described herein maintains a central repository of details of applications, servers, or other network resources across one or more technical platforms and/or business areas for use in technical migration. The automated systems and methods described herein provides a unique tracking tool platform that tracks migration activities and identifies resources network dependencies, both upstream and downstream, within a computer network environment or other such migration environment.

Generally, migration services provide infrastructure transformation activities including, but not limited to, migration, remediation, operating system (OS)/platform upgrades, and/or technical recovery. Migration services contributions include and/or apply to, for example, one or more of: data discovery enterprise assets (e.g., such as applications, servers, databases, appliances, infrastructure components, and/or the like); technical assessments; migration preparation; migration execution; and/or post migration activities such as return to stock. The MSATT toolkit provides an automated pull of structured data for specific migration effort. In some embodiments, the MSATT toolkit is provided via an interface to handle data, track status of each application (app), initiate assessment(s), and/or update review responses. In various embodiments, the MSATT toolkit is implemented as a reusable or plug-and-play component that can be used across various migration efforts with very minimal changes. The MSATT toolkit provides various benefits to technical migrations including automation, data reliability, cost reduction, and/or increases in productivity.

In various embodiments, the automated systems and methods described herein may be used to predict, forecast, or generate migration plan(s), which may include, for example, a migration plan for migrating from one version of a network resource, asset, or technology to another. As other another example, the automated systems and methods described herein may predict, forecast, or generate a migration plan, for migrating from a different resource, asset, or technology or to another, such as different version or different type of resource, asset, or technology or to another.

The automated systems and methods may comprise different tools or formats that can be used for different migration types. Such tools can include, for example, various trackers (e.g., an infrastructure-as-a-service (IAAS) tracker, a software application TP tracker, an SPS Tracker, etc.), migration simplification tools, cloud migration kit, and/or a GUI based migration tool. The tools may be comprised of several components, for example, migration schema formats as described herein. In addition, in various embodiments, the automated systems and methods described herein may provide GUI based applications capable of generating plants, overviews, and/or status reports of a migration of a technical platform and/or across business areas. The GUI based migration tools can operate on a user role basis (e.g., Admin, Team Member & Guest). In some embodiments, team members may be categorized based on business nature (TP2.0 Migration, IAAS Server Migration, SPS Migration, etc.).

In still further embodiments, automated systems and methods provide discovery of networked resources for technical migration. For example, the automated systems and methods provide computer scripted discovery and identification of technical resources (e.g., databases, servers, software, etc.) within an enterprise and/or networked environment during a migration. In some embodiments, the automated systems and methods may execute automated tools, instructions, or scripts (e.g., SPLUNK) using custom queries to pull data and information from a variety of legacy sources on a computer network. In various embodiments, the custom scripts are customized for a migration type. In some embodiments, the automated systems and methods may describe a RESTful API to pull the data and information across the variety of legacy networked resources. The data and information, such as network based dependency data, can be used to determine resources to be migrated, or resources to be replaced during migration, such as to a new or updated version or system. For example, the new or updated version or system may be a newer, cloud-based (IAAS) platform, migrated to from a traditional server or mainframe.

In additional embodiments, automation systems and methods provide reporting and status of a technical migration, including tracking and planning status of a technical migration. In such embodiments, automation systems and methods include features related to tracking multiple different types of migrations, including versioning, operating system, server, application, and hardware migrations. In various embodiments, one or more migration database schema formats are implemented or developed for each type of migration, wherein the database schema format specifies reporting and tracking data. In various embodiments, the disclosed automated systems and methods describe GUI(s) that are operable to provide reports, status, or plans of a currently active technical migration(s).

In various embodiments disclosed herein, an automated migration system is configured to generate guided user interfaces (GUIs) for tracking migrating legacy networked resources within a computer network environment during a technical migration. The automated migration system may include a migration database defining a first migration schema format corresponding to a first migration type and a second migration schema format corresponding to a second migration type. The automated migration system may further include a migration server communicatively coupled to the migration database and to a computer network comprising a plurality of online network resources. The automated migration system may further include a dashboard tracking application (app) implemented on the migration server and configured, during an active migration session, to load, according to the first migration schema format, into the migration database each of first reporting data and first tracking data of a first legacy networked resource of the plurality of online network resources and as tracked during the active migration session. The dashboard tracking app may further load, according to the second migration schema format, into the migration database each of second reporting data and second tracking data of a second legacy networked resource of the plurality of online network resources and as tracked during the active migration session. Still further, the dashboard tracking app may receive, during the active migration session, a dashboard request for graphical status of each of the first legacy networked resource and the second legacy networked resource. The dashboard tracking app may further generate automatically, based on the dashboard request, a tracking GUI rendering a first status of the first legacy networked resource based on the first reporting data and the first tracking data, and a second status of the second legacy networked resource based on the second reporting data and the second tracking data.

In additional embodiments, an automated migration method is disclosed for generating GUIs for tracking migrating legacy networked resources within a computer network environment during a technical migration. The automated migration method may include loading, by a dashboard tracking application (app) implemented on a migration server according to a first migration schema format, into a migration database each of first reporting data and first tracking data of a first legacy networked resource of a plurality of online network resources and as tracked during an active migration session. The migration database may define the first migration schema format corresponding to a first migration type and a second migration schema format corresponding to a second migration type. The automated migration method may further include loading, by the dashboard tracking app according to the second migration schema format, into the migration database each of second reporting data and second tracking data of a second legacy networked resource of the plurality of online network resources and as tracked during the active migration session. The automated migration method may further include receiving, by a dashboard tracking app during the active migration session, a dashboard request for graphical status of each of the first legacy networked resource and the second legacy networked resource. The automated migration method may further include generating automatically, by a dashboard tracking app based on the dashboard request and during the active migration session, a tracking GUI rendering a first status of the first legacy networked resource based on the first reporting data and the first tracking data, and a second status of the second legacy networked resource based on the second reporting data and the second tracking data.

In still further embodiments, a tangible, non-transitory computer-readable medium storing instructions is disclosed for generating guided user interfaces (GUIs) for tracking migrating legacy networked resources within a computer network environment during a technical migration. The instructions, when executed by one or more processors of a migration server, cause the one or more processors of the migration server to load, by a dashboard tracking application (app) implemented on the migration server according to a first migration schema format, into a migration database each of first reporting data and first tracking data of a first legacy networked resource of a plurality of online network resources and as tracked during an active migration session. The migration database may define the first migration schema format corresponding to a first migration type and a second migration schema format corresponding to a second migration type. The instructions, when executed, may further cause the one or more processors of a migration server to load, by the dashboard tracking app according to the second migration schema format, into the migration database each of second reporting data and second tracking data of a second legacy networked resource of the plurality of online network resources and as tracked during the active migration session. The instructions, when executed, may further cause the one or more processors of a migration server to receive, by a dashboard tracking app during the active migration session, a dashboard request for graphical status of each of the first legacy networked resource and the second legacy networked resource. The instructions, when executed, may further cause the one or more processors of a migration server to generate automatically, by a dashboard tracking app based on the dashboard request and during the active migration session, a tracking GUI rendering a first status of the first legacy networked resource based on the first reporting data and the first tracking data, and a second status of the second legacy networked resource based on the second reporting data and the second tracking data.

In accordance with the above, and with the disclosure herein, the present disclosure includes improvements in computer functionality or in improvements to other technologies at least because the embodiments herein describe, e.g., various migration types and migration schema formats that provide a customized platform that reduces the complexity, and, therefore memory and processor requirements of the disclose migration server(s) and migration database(s). This also provides flexibility to the disclosed server(s), which may be used to migrate any technologies with a minimum memory and processor fingerprint to the computer network. In this way, the automated migration systems and methods, as described herein, provide flexibility and efficiency to migration server(s) as a migration schema format and a related migration type may be generated, added, removed, or otherwise managed for each resource type computer network 115, and for a variety of resource types, even in real time, as the resource types are discovered or modified, thereby providing a tailored fit memory solution that that improves the memory allocation and usage of the migration server(s) 102. This thereby reduces the memory needs of the automated migration system 101 as a whole. That is, the present disclosure describes improvements in the functioning of the computer itself or "any other technology or technical field" because the speed, efficiency, or resource utilization of the migration server(s), as describe herein, are enhanced. This improves over the prior art at least because current migration systems use large, disparate, and network-wide resources to track network resources, which is not only inefficient from a timing perspective, but also from a resource gathering, implementation, and usage perspective to a computer network as a whole.

In further embodiments, the automated migration systems and methods of the present disclosure include a network resource discovery application (app) implemented on the migration server(s). In various embodiments, a first network resource discovery app may be configured with one or more predefined migration queries customized based on corresponding migration types (e.g., operating system type, etc.). In some embodiments, the automated migration systems and methods may further include a second network resource discovery app, which may operate in parallel or synchronous fashion to improve the speed and/or performance of discovering network resources as described herein, thereby improving the performance of the migration server(s) 102 as a whole.

The present disclosure includes effecting a transformation or reduction of a particular article to a different state or thing, e.g., executing predefined migration querie(s) to discover dependency data to generate a prediction, during an active migration session, of a migration plan for a target migration network resource to be implemented on a computer network at a future time, where the target migration network resource requires access to the dependency data at the future time.

The present disclosure further includes specific features other than what is well-understood, routine, conventional activity in the field, or adding unconventional steps that confine the claim to a particular useful application, e.g., executing predefined migration querie(s) to discover dependency data to generate a prediction, during an active migration session, of a migration plan for a target migration network resource to be implemented on a computer network at a future time, where the target migration network resource requires access to the dependency data at the future time.

Advantages will become more apparent to those of ordinary skill in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the system and methods disclosed therein. It should be understood that each Figure depicts an embodiment of a particular aspect of the disclosed system and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and instrumentalities shown, wherein:

FIG. 2A illustrates an example predefined migration query in accordance with various embodiments disclosed herein.

FIG. 2B illustrates an example embodiment of a database resource dependency in accordance with various embodiments disclosed herein; FIG. 2C illustrates an example embodiment of a network resource dependency in accordance with various embodiments disclosed herein.

FIG. 3A illustrates an example embodiment of a migration schema format defining a server based, and/or infrastructure-as-a-service (IAAS) based, migration type in accordance with various embodiments disclosed herein; FIG. 3B illustrates an example embodiment of a migration schema format defining an operating system based migration type in accordance with various embodiments disclosed herein.

FIG. 4B illustrates a further portion of the example tracking GUI of FIG. 4B.

FIG. 5 illustrates example a guided user interface (GUI) migration search screen in accordance with various embodiments disclosed herein.

The Figures depict preferred embodiments for purposes of illustration only. Alternative embodiments of the systems and methods illustrated herein may be employed without departing from the principles of the invention described herein.

DETAILED DESCRIPTION

Figure 1:
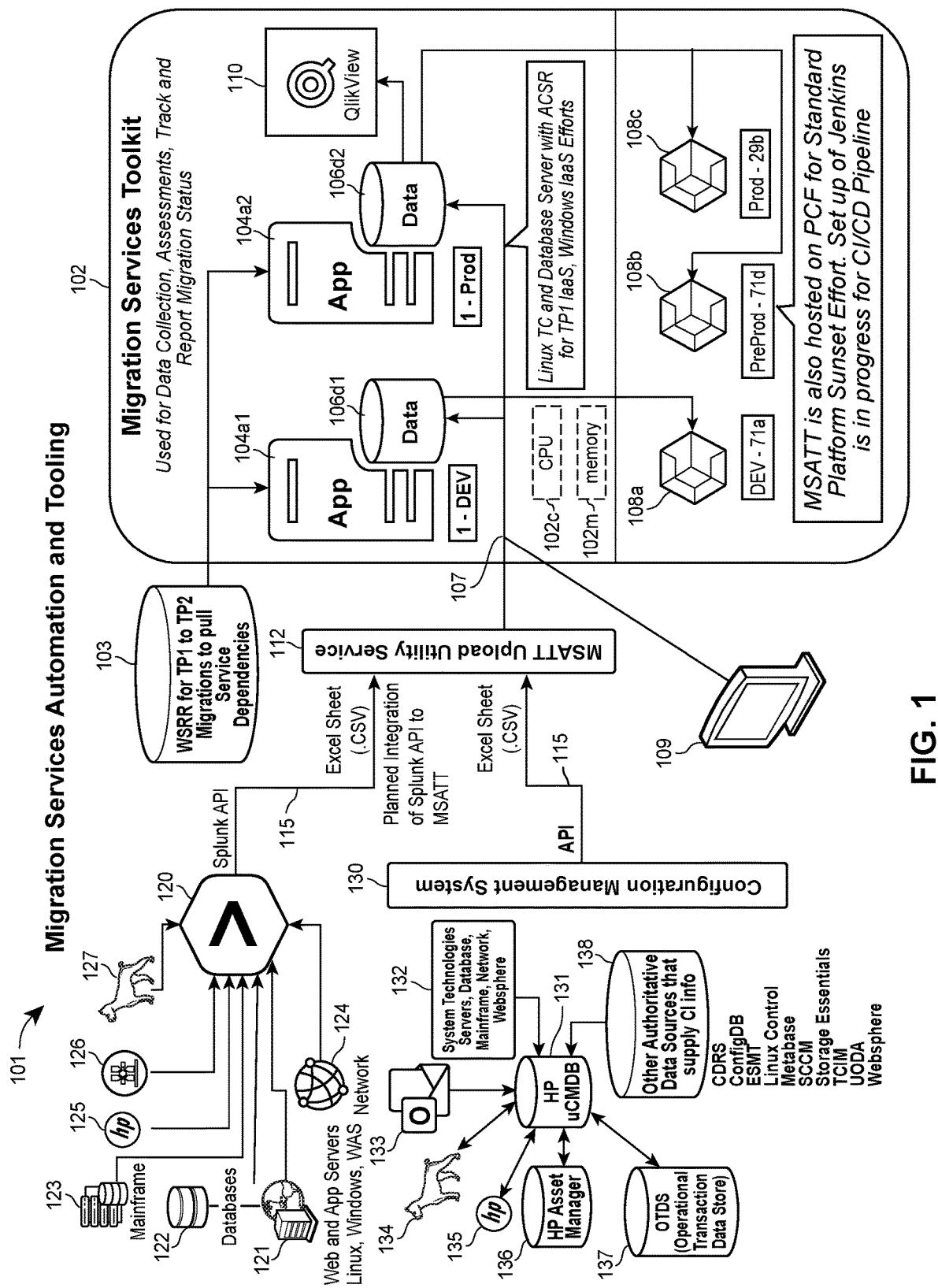
FIG. 1 illustrates an automated migration system in accordance with various embodiments disclosed herein.

FIG. 1 illustrates an automated migration system 101 in accordance with various embodiments disclosed herein. In the example embodiment of FIG. 1, automated migration system 101 includes server(s) 102, which may be referred to herein as "migration server(s)," and which may comprise one or more computer servers. The migration server(s) 102 may be communicatively coupled to migration databases 106d1 and/or 106d2 and to a computer network 115 comprising a plurality of online network resources (e.g., legacy networked resources 121 to 123 and/or 131 to 133) and/or non-legacy networked resources (e.g., non-legacy networked resources 124 to 127 and/or 134 to 138) as described herein.

The migration server(s) 102 generally provide a variety of migration services as a "toolkit" of automated services that may be executed during technical migration(s) as described herein. In some embodiments, migration server(s) 102 may be implemented on Linux or Windows server(s). In addition, the migration server may implement, generate, or execute HTML, Java, JQuery, Ajax, Java Server Pages (JSP) on a TOMCAT Servlet container and/or SpringMVC framework, for example, to execute queries and/or generate web pages and/or GUIs, such as any GUIs or reports described herein.

In various embodiments, server(s) 102 comprise multiple servers, which may comprise multiple, redundant, or replicated servers as part of a server farm. For example, in the embodiment of FIG. 1, server(s) 102 are depicted with redundant systems. For example, network resource discovery app 104a1 and migration database 106d1 are depicted as implemented on a development server (e.g., of servers(s) 102), where network resource discovery app 104a2 and migration database 106d2 are depicted as implemented on a production server (e.g., of servers(s) 102).

In some embodiments, server(s) 102 may be implemented as cloud-based servers. For example, server(s) 102 may be a cloud-based platform such as MICROSOFT AZURE, AMAZON AWS, or the like.

Server(s) 102 may include one or more processor(s) 102c as well as one or more computer memories 102m. The memories 102m may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others. The memories 102m may store an operating system (OS) (e.g., Microsoft Windows, Linux, UNIX, etc.) capable of facilitating the functionalities, apps, methods, or other software as discussed herein. The memories 102m may also store machine readable instructions, including any of one or more application(s), one or more software component(s), and/or one or more application programming interfaces (APIs), which may be implemented to facilitate or perform the features, functions, or other disclosure described herein, such as any methods, processes, elements or limitations, as illustrated, depicted, or described for the various flowcharts, illustrations, diagrams, figures, and/or other disclosure herein. For example, at least some of the applications, software components, or APIs may be, include, otherwise be part of, the resource discovery application or other apps described herein, where each are configured to facilitate their various functionalities discussed herein. It should be appreciated that one or more other applications may be envisioned and that are executed by the processor(s) 102c.

The processor(s) 102c may be connected to the memories 102m via a computer bus responsible for transmitting electronic data, data packets, or otherwise electronic signals to and from the processor(s) 102c and memories 102m in order to implement or perform the machine readable instructions, methods, processes, elements or limitations, as illustrated, depicted, or described for the various flowcharts, illustrations, diagrams, figures, and/or other disclosure herein.

The processor(s) 102c may interface with the memory 102m via the computer bus to execute the operating system (OS). The processor(s) 102c may also interface with the memory 102m via the computer bus to create, read, update, delete, or otherwise access or interact with the data stored in the memories 102m and/or databases 106d1 and/or 106d2 (e.g., a relational database, such as ORACLE, DB2, MySQL, or a NoSQL based database, such as MongoDB). The data stored in the memories 102m and/or the databases 106d1 and/or 106d2 may include all or part of any of the data or information described herein, including, for example, the one or more search requests, the one or more transaction details, and the profile information of the user.

Server(s) 102 may further include a communication component configured to communicate (e.g., send and receive) data via one or more network port(s) (e.g., network port 107) to one or more networks or local terminals, such as computer network 115 and/or terminal 109 (for rendering or visualizing) as described herein. In some embodiments, server(s) 102 may include a client-server platform technology such as ASP.NET, Java J2EE, Ruby on Rails, Node.js, a web service or online API, responsive for receiving and responding to electronic requests. Server(s) 102 may implement client-server platform technology that may interact, via the computer bus, with the memories(s) 102m (including the applications(s), component(s), API(s), data, etc. stored therein) and/or databases 106d1 and/or 106d2 to implement or perform the machine readable instructions, methods, processes, elements or limitations, as illustrated, depicted, or described for the various flowcharts, illustrations, diagrams, figures, and/or other disclosure herein. According to some embodiments, the server(s) 102 may include, or interact with, one or more transceivers (e.g., WWAN, WLAN, and/or WPAN transceivers) functioning in accordance with IEEE standards, 3GPP standards, or other standards, and that may be used in receipt and transmission of data via external/network ports connected to computer network 115.

Server(s) 102 may further include or implement an operator interface configured to present information to an administrator or operator and/or receive inputs from the administrator or operator. As shown in FIG. 1, an operator interface, or Guided User Interface (GUI), may provide a display screen (e.g., via terminal 109). Server(s) 102 may also provide I/O components (e.g., ports, capacitive or resistive touch sensitive input panels, keys, buttons, lights, LEDs), which may be directly accessible via or attached to server(s) 102 or may be indirectly accessible via or attached to terminal 109. According to some embodiments, an administrator or operator may access the server 102 via terminal 109 to review information, make changes, input training data, and/or perform other functions.

In general, a computer program or computer based product, or application, (e.g., the resource discovery application) in accordance with some embodiments may include a computer usable storage medium, or tangible, non-transitory computer-readable medium (e.g., standard random access memory (RAM), an optical disc, a universal serial bus (USB) drive, or the like) having computer-readable program code or computer instructions embodied therein, wherein the computer-readable program code or computer instructions may be installed on or otherwise adapted to be executed by processor(s) (e.g., processors 102c working in connection with the respective operating system in memories 102m) to facilitate, implement, or perform the machine readable instructions, methods, processes, elements or limitations, as illustrated, depicted, or described for the various flowcharts, illustrations, diagrams, figures, and/or other disclosure herein. In this regard, the program code may be implemented in any desired program language, and may be implemented as machine code, assembly code, byte code, interpretable source code or the like (e.g., via Golang, Python, C, C++, C#, Objective-C, Java, Scala, Actionscript, Javascript, HTML, CSS, XML, etc.).

In some embodiments, server(s) 102 may implement or include Pivotal Cloud Foundry (PCF) servers, including servers 108a (development level), 108b (pre-production level), and/or 108c (production level), for managing the automated migration system 101 external properties across various environments of computer network 115. For example, as a given network resource moves through the deployment pipeline from development to test and into production, the PCF server(s) 108a to 108c, as part of sever(s) 102, may be used to manage the configuration between environments to determine that a migrated resource has everything it needs (e.g., dependency data) to run when migrated.

In the embodiment of FIG. 1, automated migration system 101 may be configured to discover and track a migration of legacy networked resources (e.g., legacy networked resources 121 to 123 and/or legacy networked resources 131 to 133) and/or non-legacy networked resources (e.g., non-legacy networked resources 124 to 127 and/or 134 to 138), within a computer network environment (e.g., of computer network 115). The computer network may be a computer network of a company or other such enterprise. In various embodiments, computer network 115 may be a private network (e.g., local area network (LAN) or wide area network (WAN)) operating within a technical environment of an institution or company. In other embodiments, however, computer network 115 may be a public network. In still further embodiment, computer network 115 may be a virtual private network (VPN) implemented over a public network, such as the Internet.

In the embodiment of FIG. 1, the automated migration system 101 includes migration databases 106d1 and/or 106d2. Each of migration databases 106d1 and/or 106d2 may define migration schema format(s) of respective migration type(s). Migration schema format(s) and respective migration type(s) (e.g., as described herein for FIGS. 3A and 3B) generally correspond to the types of network resources (e.g., legacy networked resources 121 to 123 or and/or 131 to 133) involved in a technical migration. For example, a legacy and/or non-legacy networked resource may define a resource type corresponding to a migration type and a predefined migration query. A resource type may include, e.g., "an operating system type, where "WINDOWS 2012" is an example of an operating system type. In various embodiments, migration databases 106d1 and/or 106d2 are communicatively coupled to the migration server(s) 102 and the computer network 115, and may define a migration schema format of the migration type that corresponds to the resource type (e.g., "windows 2012") for migration.

Migration schema formats and migration types provide customization to automated migration system 101, allowing migration server(s) 102 to aggregate and streamline dependency data according to a migration schema format. In various embodiments, migration databases 106d1 and/or 106d2 may be configured with different migration schemas based on migration types. Migration types may include migrations of one software application to another and/or one hardware type to another. For example, migration types can include, for example, a server migration type (e.g., for a REDHAT based server migration to a MICROSOFT based server), a database migration type (e.g., for a IBM DB2 based database migration to an ORACLE based database), and an operating system migration type (e.g., for a WINDOWS 2012 based operating system migration to a WINDOWS 2018 based operating system). The various migration types and migration schema formats provide a customized technical solution, reducing the complexity, and, therefore the memory and processor requirements of migration server(s) 102 and migration database(s) 106d1 and/or 106d1. Such a solution also provides flexibility and may be used to migrate various technologies while utilizing a minimum memory and processor fingerprint on the computer network. In this way, the automated migration system 101 can provide both flexibility and efficiency to migration server(s) 102, as a migration schema format and a related migration type may be generated, added, removed, or otherwise managed for each resource type of computer network 115, and for a variety of resource types as the resource types are discovered or modified. This provides a tailored fit memory solution that that improves the memory allocation and usage of the migration server(s) 102, and therefore reduces the memory needs of the automated migration system 101 as a whole.

In the embodiment of FIG. 1, the automated migration system 101 includes a network resource discovery application (app) 104a1 implemented on the migration server(s) 102. In various embodiments, network resource discovery app 104a1 is configured with one or more predefined migration queries customized based on corresponding migration types (e.g., operating system type, etc.). Automated migration system 101 also includes network resource discovery app 104a2, which may be a production level version of network resource discovery app 104a1, and where network resource discovery app 104a1 may be a development level version. In some embodiments, however, network resource discovery app 104a1 and network resource discovery app 104a2 may be copies of one another (e.g., production versions), where each of resource discovery app 104a1 and network resource discovery app 104a2 may operate in parallel or in a synchronous fashion to improve the speed and/or performance of discovering network resources as described herein, thereby improving the performance of the migration server(s) 102 as a whole. As used herein, disclosure for discovery app 104a1 may apply equally for disclosure of discovery app 104a2, and vice versa. Similarly, disclosure for database 106*d*1 may apply equally for disclosure of database 106*d*2.

In the embodiment of FIG. 1, network resource discovery app 104*a*1 is configured, during an active migration session, to execute a predefined migration query, as selected from one or more predefined migration queries customized based on corresponding migration types (e.g., a server migration type, a database migration type, an operating system migration type, etc.). An active migration session any comprise a period where one technology (e.g., a first network resource), software and/or hardware, is being transitioned to another technology (e.g., a second network resource) within a network environment, or where assets of one technology (e.g., a third network resource), software and/or hardware, is being updated with, shared with, or moved to another technology (e.g., a fourth network resource) within a network environment. During an active migration session, predefined migration queries may be configured to discover a set of network dependencies of a legacy networked resource (e.g., legacy resource 121) accessible on a computer network (e.g., computer network 115) comprising a plurality of online network resources. Network dependencies may include, but are not limited by, any of e.g., resource dependencies, network dependencies, service traffic data, etc., as illustrated, for example, in FIG. 2B herein. Generally, predefined migration queries provide sets of data collection tools to collect data from various sources (e.g., network resources) to be stored in a centralized repository (e.g., migration database(s) 106*d*1 and/or 106*d*2).

In some embodiments, predefined migration queries may include SPLUNK based migration queries that access, or are based on, a SPLUNK application programing interface (API) 120. As shown in the embodiment of FIG. 1, the SPLUNK based queries are configured to discover network resources, including legacy networked resources 121 to 123 and/or non-legacy networked resources 124 to 127 of computer network 115, and/or related set(s) of dependencies and data thereof. In various embodiments, the set of set of network dependencies can include one or more software resources accessible on the computer network 115. For example, software based network resources may include any one or more of web/app servers, operating systems, or the like, such as operating system 121 (e.g., Linux or Windows), database 122 (e.g., IBM DB2 software), and software applications 125, 126, and 127. In addition, a set of network dependencies may include one or more hardware devices accessible on the computer network 115. For example, hardware network resources may include mainframe 123 and/or network 124 (e.g., network components, such as switches, routers, etc.). Generally, software and hardware network resources, or some combination thereof, may include or be application level dependencies (e.g., an app), object level dependencies (e.g., SOAP service), asset level dependencies (.css or .js files), database dependencies, REST dependencies, service dependencies, etc., each as executing on servers or other devices accessible on computer network 115.

In some embodiments, custom SPLUNK queries of SPLUNK API 120 (e.g., predefined migration queries) are used to discover software and/or hardware dependencies, e.g., online data sources, network services, databases, RESTful application programming interfaces (APIs), etc., which may be situated on or include any one or more of legacy networked resources 121 to 123 and/or non-legacy networked resources 124 to 127 of computer network 115.

For example, FIG. 2A illustrates an example predefined migration query 202 in accordance with various embodiments disclosed herein. Predefined migration query 202 may be selected from one or more predefined migration queries 200. In some embodiments, predefined migration query 202 may be newly added to predefined migration queries 200. The embodiment of FIG. 2A illustrates a SPLUNK based migration query that defines an "input lookup" query for a network resource as identified as "P7ECS." In the embodiment of FIG. 2A, predefined migration query 202, identified a network resource 212 ("ECSOnline-P7ECS01") has a cascading style sheet ("CSS") dependency 212*c*. For example, with respect to FIG. 1, network resource 212 may correspond to web/app server software and/or operating system 121 that depends on a CSS file (dependency 212*c*) for rendering a webpage or website hosted by web/app server software and/or operating system 121.

FIGS. 2B and 2C illustrate example resource dependencies in accordance with various embodiments disclosed herein. In particular FIG. 2B illustrates database resource dependencies 250. FIG. 2C illustrates network resource dependencies 280. Each of database resource dependencies 250 and network resource dependencies 280 may represent dependency data as discovered and/or pulled by predefined migration queries (e.g., SPLUNK based queries) for technical migration as describe herein. For example, database resource dependencies 250 of FIG. 2B may include dependency data 252, including dependency EAR (enterprise archive file) ("P7ECS01"), database host name ("SQLLPSSSS1 OPR STATEFARM.org"), db_name ("SFSQL_SESSIONSTATE"), and db_location ("8"), each of which may correspond to database 122 network resource of computer network 115 of FIG. 1. Database resource dependencies 250 may include additional dependency data as illustrated by FIG. 2B.

As a further example, network resource dependencies 280 of FIG. 2C includes dependency data 282, including protocol ("tcp"), enterprise archive (EAR) file ("P7ECS"), local location ("Olathe"), local operating system ("Linux), remote prefix description ("Mainframe"), etc., each of which may correspond to mainframe 123, a network resource of computer network 115 as shown for FIG. 1. Network resource dependencies 280 may include additional dependency data as illustrated by FIG. 2C.

Additionally or alternatively, predefined migration queries, as described herein, may include Configuration Management System (CMS) based migration queries that access, or are based on, a CMS application programing interface (API) 130. Generally, CMS is an application or API that can inventory software or hardware assets. With respect to the embodiment of FIG. 1, CMS API 130, and its related predefined migration queries, interact with a CMS database 131 to discover network resources, including legacy networked resources 131 to 133 and/or non-legacy networked resources 134 to 138 of computer network 115, and related set(s) of dependencies and data thereof. In various embodiments, the set of set of network dependencies can include one or more software resources accessible on the computer network 115. For example, software network resources may include application 133 (e.g., MICROSOFT OUTLOOK Exchange"), applications 134 and 135, and databases 136, 137, and 128 (e.g., HP Agent Manager, OTDS, etc.). In addition, a set of network dependencies may include one or more hardware devices accessible on the computer network 115. For example, hardware network resources may include mainframe 132. Generally, software and hardware network resources, or some combination thereof, may include or be application level dependencies (e.g., an app), object level dependencies (e.g., SOAP service), asset level dependencies (.css or .js files), database dependencies, REST dependencies, service dependencies, etc., each as executing on servers or other devices accessible on computer network 115.

In various embodiments, CMS related queries (e.g., of CMS API 130) and SPLUNK migration queries (e.g., of SPLUNK API 120, such as predefined migration query 202) may be used to discover, monitor, and/or sniff computer network 115 for network resources, e.g., any of legacy networked resources (e.g., legacy networked resources 121 to 123 or 131 to 133, or non-legacy resources 124 to 127 or 134 to 128), which can include by discovery, monitoring, sniffing traffic or network calls (e.g., MQ/queue calls). Additionally or alternatively, pre-defined SPLUNK or CMS queries may access RESTful API(s), which may discover and/or acquire dependency data from one or more online network resources. In some embodiments, SPLUNK or CMS queries may prepopulate dependencies automatically based on what is coded in a predefined, custom script, such as a SPLUNK or CMS custom scripts/queries. In other embodiments, dependency data and/or resource status data may be input manually. It is to be understood that the SPLUNK and CMS migration queries are provided as examples, and additional predefined migration queries based on other APIs or software may be used in accordance with the disclosure herein.

In some embodiments, server(s) 102 and/or network resource discovery app 104a1 may include or access a data analyzer capable of identifying dependency data. For example, the data analyzer may determine that discovered data (e.g., dependency data) is upstream or downstream data of a particular network resource in computer network 115. The data analyzer may determine, for example, upstream or downstream dependency data based on a location or positioning of a network resource's location within computer network 115 relative to other network resources. In various embodiments, migration complexity, migration plans or forecasts, as describe herein, can be determined, generated, or otherwise derived based on the dependencies.

In various embodiments, automated migration system 101, by execution of network resource discovery app 104a1 and/or predefined migration queries, is configured to discover downstream and/or upstream dependency relationships between or among network resources of computer network 115. For example, in some embodiments, a predefined migration query, as executed by discovery app 104a1 and/or migration servers(s) 102, may be configured to discover a downstream network resource (e.g., database 122) of a legacy networked resource (e.g., operating system 121). For example, as shown in FIG. 1, the downstream network resource (e.g., database 122) is downstream on computer network 115 to the legacy networked resource (operating system 121) and is accessible on the computer network 115 to the legacy networked resource (e.g., operating system 121). Operating system 121 may be a legacy networked resource because it is an operating system (e.g., "Windows 2012") where manufacturer support (by MICROSOFT) may be scheduled to be discontinued. In such an embodiment, a predefined migration query may be configured to determine that the downstream network resource (e.g., database 122) is a downstream dependency as accessed by legacy networked resource (e.g., operating system 121). For example, operating system 121 may access data from, and, therefore depend on database 122.

Similarly, in some embodiments, a predefined migration query, as executed by migration servers(s) 102, may be configured to discover an upstream network resource (e.g., CMS database 131) of a legacy networked resource (e.g., application 133 (e.g., MICROSOFT OUTLOOK Exchange")). Application 133 may be a legacy networked resource because it is an older version (e.g., older version of OUTLOOK) where manufacturer support (e.g., by MICROSOFT) for the particular version is scheduled to be discontinued, thereby, creating the need to migrate to a new version or other software platform. As shown in FIG. 1, the upstream network resource (e.g., CMS database 131) is upstream on the computer network to the legacy networked resource (e.g., application 133). The upstream network resource (e.g., CMS database 131) is configured to access, or receive data from, the legacy networked resource (e.g., application 133) on the computer network 155. In such an embodiment, a predefined migration query is configured to determine that the upstream network resource (e.g., CMS database 131) has an upstream dependency on the legacy networked resource (e.g., application 133).

In various embodiments, server(s) 102 and/or network resource discovery app 104a1 may be configured to load, during an active migration session, dependency data representative of discovered set(s) of network dependencies into a migration database (e.g., migration database 106d1) according to a migration schema format as described herein. For example, as shown in FIG. 1, predefined migration queries may discover, pull and/or aggregate dependency data (e.g., upstream and/or downstream) or other data from the online network resources (e.g., legacy networked resources 121 to 123 or and/or 132 to 133) and/or non-legacy networked resources (e.g., non-legacy networked resources 124 to 127 and/or 134 to 138) for ingestion or storage into migration database(s) 106d1 and/or 1062.

In some embodiments, the dependency data or other data pulled or discovered by predefined migration queries may be uploaded or otherwise provided via excel spreadsheet (.csv) format, which may then be uploaded or provided to database(s) 106d1 and/or 1062 by an upload utility service 112. In some embodiments, for example, upload utility service 112 may be a RESTful web service.

In some embodiments, as shown in FIG. 1, network resource discovery app 104a1, may use a registry and/or repository database (e.g., database 103, which may be an IBM WESPHERE Service Registry and Repository) to discover, pull, or otherwise retrieve and store dependency data.

In some embodiments, the migration server is configured to export a listing of network dependencies of one or more discovered legacy networked resources. For example, such a listing may include a spreadsheet (e.g., "Master Tracker") showing current discovered legacy networked resources and their related dependencies.

In various embodiments, the automated system 101 and/or migration server(s) 102 may generate, predict, and/or forecast, based on the dependency data or other data as pulled, discovered, and/or aggregated by network resource discovery app 104a1 and/or migration database(s) 106d1 and/or 1062, a migration plan for a target migration network resource to be implemented on computer network 115. The target migration network resource may requiring access to the dependency data at the future time. For example, a new or target operating system (e.g., "Windows 2019") may be a target migration network resource to be implemented on the computer network 115 at a future time (e.g., at a time when the migration is complete or before Windows 2012 is no longer supported). The target migration network resource may require access to the dependency data (e.g., databased data of database 122) at the future time.

A migration plan can be generated and provided by server(s) 102 at any point in time, including in real time or near real time, to reflect a current status or plan based on recently or currently discovered data. In this, way the migration plan can be updated routinely to provide a high level of accuracy and tracking for the technical migration.

In some embodiments, network resource discovery app 104*a*1 may further be configured to execute a second predefined migration query, as selected from the one or more predefined migration queries. The second predefined migration query may be executed to discover a second set of network dependencies of a non-legacy networked resource (e.g., application 125) accessible on computer network 115. The non-legacy networked resource may define a second resource type (e.g., HEWLETT PACKARD (HP) resource) corresponding to a second migration type (as defined in database(s) 106*d*1 and/or 106*2* for application 125) and the second predefined migration query. Generally, a non-legacy networked resource may be a network resource that is not currently planned for removal or discontinued use on computer network 115. In such embodiments, network resource discovery app 104*a*1 is further configured to load, during the active migration session, the second dependency data representative of the discovered second set of network dependencies into database(s) 106*d*1 and/or 106*2* according to a second migration schema format. In addition, in some embodiments, network resource discovery app 104*a*1 may further configured to update, during the active migration session, the migration plan for the target migration network resource (e.g., "Windows 2019") to be implemented on the computer network at the future time where the target migration network resource requires access to the second dependency data at the future time. For example, in some embodiments, Windows 2019 may depend on data or other resources from application 125 to operate in a newly migrated technical environment once a technical migration involving moving to Windows 2019 is completed (or in some embodiments while a technical migration is currently ongoing).

FIGS. 3A and 3B illustrate example migration schema formats 300 and 350 in accordance with various embodiments disclosed herein. For example, automated migration system 101 includes migration databases 106*d*1 and/or 106*d*2. Each of migration databases 106*d*1 and/or 106*d*2 may define migration schema formats 300 and 350 that each define different migration types.

As illustrated for FIG. 3A, migration schema format 300 defines a server based, and/or infrastructure-as-a-service (IAAS) based, migration type. The migration schema format 300 may represent or be a server migration type of a network resource defining a resource type. For example, the migration schema format 300 may represent or be a server migration type of a network resource (e.g., mainframe 132) defining a resource type (e.g., of a REDHAT based server or mainframe), as illustrated by FIGS. 1 and 3A. As illustrated by FIG. 3A, migration schema format 300 includes or defines various data related to a technical migration of a server migration type. For example, as illustrated, migration schema format 300 includes a resource type data 302 ("VAR_SERVER_TYPE") which may define, or otherwise indicate, that mainframe 132 is a REDHAT based server or mainframe. In addition, as illustrated by FIG. 3A, migration schema format 300 includes or defines status data 304 ("VAR_MIGRATION_COMPLETE_DATE"), which may define or otherwise indicate a migration completion date or expected/target migration completion date for migrating a network resource (e.g., mainframe 132), e.g., from one server type to another (e.g., for a REDHAT based server migration to a MICROSOFT based server), within the computer network 115 or otherwise a computer network environment during a technical migration.

In some embodiments, the migration schema format 300 may represent, define, or at least include information regarding, a target migration network resource (not shown) to be implemented on the computer network at a future time. For example, in the embodiment of FIG. 3A, the target migration network resource may be a MICROSOFT based server, where mainframe 132, and/or its data, dependencies, dependency data, or otherwise resources are to be migrated from the original resource type (e.g., from existing REDHAT based server or mainframe 132) to a target migration network resource. In various embodiments, the target migration network resource (e.g., the MICROSOFT based server) may require access to the dependency data or other resources at the future time.

FIG. 3B provides an additional example migration schema format 350. As illustrated for FIG. 3B, migration schema format 350 defines an operating system based migration type, e.g., regarding "Windows 2012." The migration schema format 350 may represent or be an operating system migration type of a network resource defining a resource type. For example, the migration schema format 350 may represent or be an operating system migration type of a network resource (e.g., operating system 121) defining a resource type (e.g., "Windows 2012" as running on a server), as illustrated by FIGS. 1 and 3B. As illustrated by FIG. 3B, migration schema format 350 includes or defines various data related to a technical migration of an operating system migration type. For example, as illustrated, migration schema format 350 includes operating system type data 354 ("OPERATING_SYSTEM") which may define, or otherwise indicate, that operating system 121 is a WINDOWS 2012 based operating system. In addition, as illustrated by FIG. 3B, migration schema format 350 includes or defines server type data 352 ("SERVER_TYPE"), which may define or otherwise include data indicating the type of server (e.g., which is another type of network resource) that operating system 121 runs on.

In addition, as illustrated by FIG. 3B, migration schema format 350 includes or defines status data 356 ("MIGRATION STATUS"), which may define or otherwise include a migration status (e.g., "51% complete" or "mid-stage") for migrating a network resource (e.g., operating system 121), e.g., from one operating system type to another (e.g., for a WINDOWS 2012 based operating system migration to a WINDOWS 2018 based operating system), within the computer network 115 or otherwise a computer network environment during a technical migration.

In some embodiments, the migration schema format 350 may represent, define, or at least include information regarding, a target migration network resource (not shown) to be implemented on the computer network at a future time. For example, in the embodiment of FIG. 3B, the target migration network resource may be an updated MICROSOFT WINDOWS operating system (e.g., WINDOWS 2018), where operating system 121, and/or its data, dependencies, dependency data, or otherwise resources are to be migrated from the original resource type (e.g., from existing operating system 121, e.g., WINDOWS 2012). In various embodiments, the target migration network resource (e.g., WINDOWS 2018) may require access to the dependency data or other resources at the future time. In such embodiments, dependency data, as described herein, may be defined or otherwise included by migration schema format 350 and/or databases 106*d*1/106*d*2. For example, as illustrated by FIG. 3B, dependency data 358 may define dependency data that the target migration network resource (e.g., WINDOWS 2018) may utilize or otherwise depend on during and/or upon completion of a technical migration.

Figure 4A:
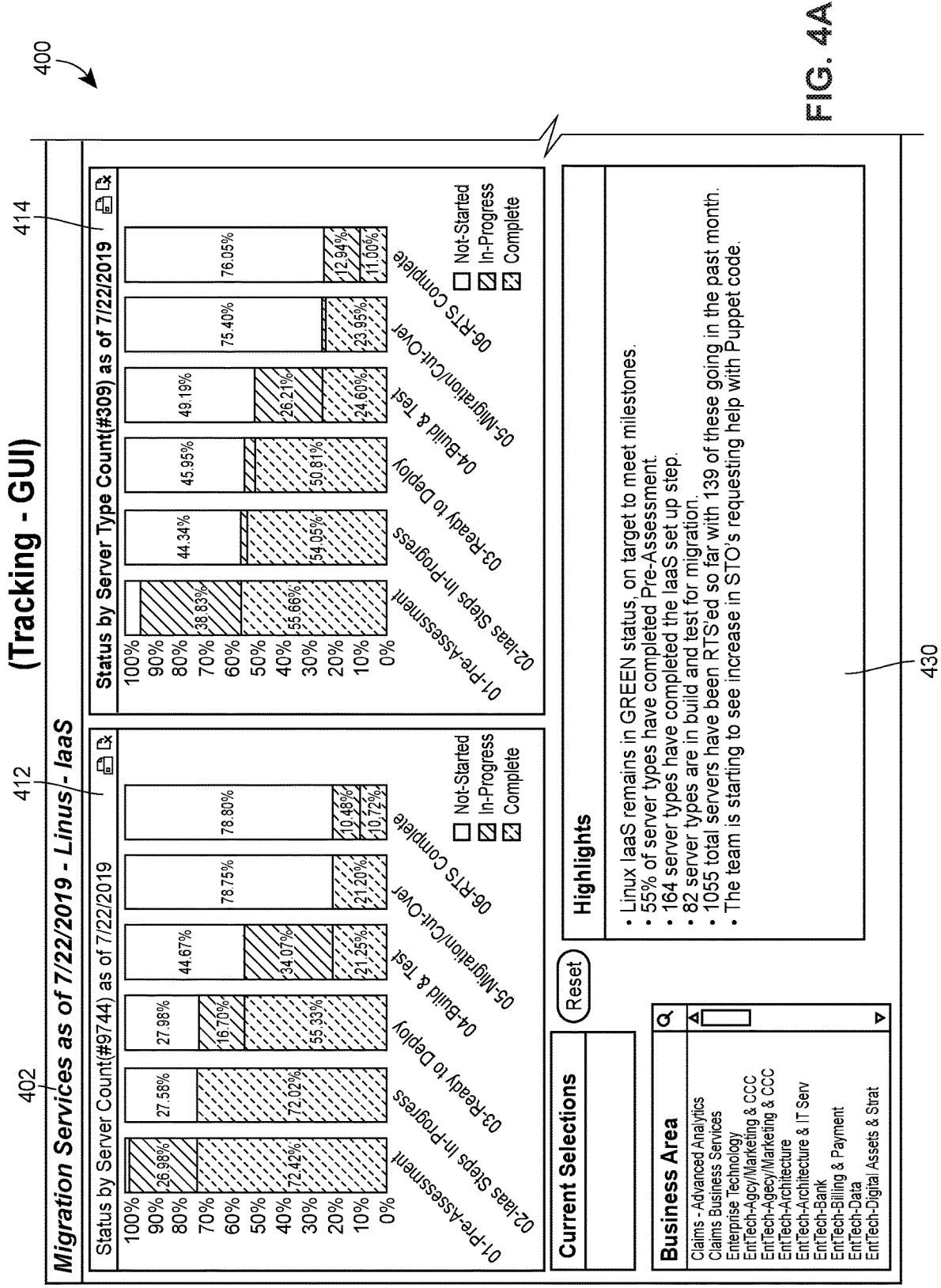
FIG. 4A illustrates a portion of an example tracking guided user interface (GUI) in accordance with various embodiments disclosed herein.

FIG. 4A illustrates a portion of an example tracking guided user interface (GUI) 400 in accordance with various embodiments disclosed herein. As provided in herein, the automated migration system 101 provides end-to-end discovery of dependencies (and related data) for GUI rendering, tracking, and reporting. Tracking GUI 400 illustrates an embodiment of a GUI based tool for rendering, tracking, and reporting the various discovered network resources, including their statuses, and/or other information related to a technical migration. Tracking GUI 400 is capable of generating reports in various forms and that can be shared across various networks, for example, within a company to identify roadblocks, statuses, or other issues of a technical migration.

For example, as shown for FIG. 4A, tracking GUI 400 illustrates a tracking GUI regarding an IAAS based migration 402. Tracking GUI 400 may be implemented as a GUI-based migration dashboard that provides real time reporting, tracking and/or planning data regarding migration status or for generating a migration plan. For example, in the embodiment of FIG. 4A, tracking GUI 400 illustrates an IAAS based migration plan 402, which may correspond to migration schema format 300, defining a server based, and/or infrastructure-as-a-service (IAAS) based, migration type, as described for FIG. 3A herein. Tracking GUI 400 defines or otherwise includes status of various IAAS servers based on server 412 and server type 414. For example, Tracking GUI 400, via its GUI-based migration dashboard, may indicate or provide a graphical status or indication as to how many actual servers 412 and/or server type 414 are in a pre-assessment stage, IAAS steps in-progress stage, ready to deploy stage, build & test stage, migration cutover stage, or RTS complete stage with respect to a technical migration. As shown, each of these stages and statuses may be shown via status indicator bars showing percentage of completion at each stage for each of server 412 and server type 414.

Information for tracking the network resources (e.g., legacy networked resources 121 to 123 and/or 131 to 133) and/or non-legacy networked resources (e.g., non-legacy networked resources 124 to 127 and/or 134 to 138) may also rendered by or via tracking GUI 400. For example, as shown for FIGS. 4A and 4B, server count tracking information 422 may be displayed, which may correspond to server 412 status. The count may include or comprise the server statuses pre-assessment stage, IAAS steps in-progress stage, ready to deploy stage, build and test stage, migration cutover stage, or RTS complete stage, and may identify which servers have not-started, are in progress, or are complete with respect to a technical migration. Similarly, server count by server type tracking information 424 may be displayed, which may correspond to server type 414 status. The count may include or comprise the server statuses pre-assessment stage, IAAS steps in-progress stage, ready to deploy stage, build and test stage, migration cutover stage, or RTS complete stage, and identify which servers have not-started, are in progress, or are complete with respect to a technical migration. In the embodiment of FIGS. 4A and 4B, any or all of the server(s) 412, server type(s) 414, server count tracking information 422, and/or count by server type tracking information 424 may correspond to servers of the computer network, including any servers that comprise, at least in part, of any of the network resources (e.g., legacy networked resources 121 to 123 and/or 131 to 133) and/or non-legacy networked resources (e.g., non-legacy networked resources 124 to 127 and/or 134 to 138). For example, mainframe 123 and/or mainframe 132 may be included in the information of the server(s) 412, server type9s) 414, server count tracking information 422, and/or count by server type tracking information 424, and therefore be tracked or represented by tracking GUI 400.

Such data and status, which in various embodiments can be discovered and/or displayed in real time or near real time, can be used to plan a migration for one or more target migration network resource(s) to be implemented on the computer network 115 as described herein. In some embodiments, the data or status can be modified at any point of time, for example, with a GUI-based migration dashboard (e.g., tracking GUI 400) or by executing and/or re-executing the predefined migration queries as described herein to provide up to date and/or real time reporting of the technical migration.

In some embodiments, as illustrated by FIG. 4A, tracking GUI 400 may include a highlights tracker 430 for indicating milestone or highlight messages. These may include, for example, "Linux IaaS remains in GREEN status, on target to meet milestones," "55% of server types have completed Pre-Assessment," "82 server types are in build and test for migration," etc.

GUI-based migration dashboards of FIGS. 4 may be rendered or displayed via terminal 109 and/or view 110, which may be, in some embodiments, a web page or mobile app. For example, with respect to FIG. 1, in various embodiments, tracking GUI 400 may be implemented or rendered as view app 110 communicatively coupled to servers(s) 102. For example, in some embodiments, view app 110 may be a web based application or web site generated by server(s) 102 and/or discovery application app 104*a*1. In other embodiments, the tracking GUI may be implemented as a web browser plugin configured to access migration server(s) on the computer network. In such embodiments, wherein the web browser plugin may initiate and/originate a dashboard request for generation of tracking GUI 400, which may render status, reporting data, tracking data, etc. of one or more network resources (e.g., legacy or non-legacy) resources.

In still further embodiments, view app 110, and/or other software or apps disclosed herein, such as discovery application app 104*a*1, may, together or separately, be implemented as light-weight plugin or application that can be plugged into a server(s) and/or website application for implementation of a technical migration on any given computer network environment and/or other technical environment(s) in accordance with the present disclosure.

FIG. 5 illustrates example a guided user interface (GUI) migration search screen 500 in accordance with various embodiments disclosed herein. In the embodiment of FIG. 5, GUI migration search screen 500 is configured to receive a search request via search request field 502 corresponding to a network resource (e.g., legacy networked resource, such as mainframe 123) and a migration type (e.g., migration schema format 300 defining a server based, and/or infrastructure-as-a-service (IAAS) based, migration type). As illustrated by FIG. 5, search request field 502 may generate or issue a search request by a server type name or by a particular search field.

GUI migration search screen 500 further includes a second search request field. Search request field 504 may generate or issue a search request for any dependency, status, identity, or other information associated with, corresponding to, or related to a network resource, e.g., any of online network resources (e.g., legacy networked resources 121 to 123 and/or 131 to 133) and/or non-legacy networked resources (e.g., non-legacy networked resources 124 to 127 and/or 134 to 138) as described herein. In the embodiment of GUI migration search screen 500, a server based network resource search (e.g., for legacy networked resource, such as mainframe 123) may be performed via search request field 504, which may provide search results for server based network resources, e.g., legacy networked resource, such as mainframe 123 as described herein. For example, search result 506 may correspond to a network resource (e.g., mainframe 123), which, in the example of FIG. 5, includes the status and information data, including Server Type, Server Name, Micro Status ("Step 4.1—Server Builds), PV Status, etc.

In some embodiments, a search request (e.g., as generated or initiated by search request field 502 and/or search request field 504) may cause GUI migration search screen 500 to display an display editing interface (not shown) for configuring a status of a given network resource (e.g., a first legacy networked resource corresponding to a first migration type or a second legacy networked resource corresponding to a second migration type). In such embodiments, the a user may adjust, update, or create status, dependency data, or other data or information as described herein, via the display editing interface, for any given network resource (e.g., legacy networked resources 121 to 123 and/or 131 to 133) and/or non-legacy networked resources (e.g., non-legacy networked resources 124 to 127 and/or 134 to 138).

Figure 6:
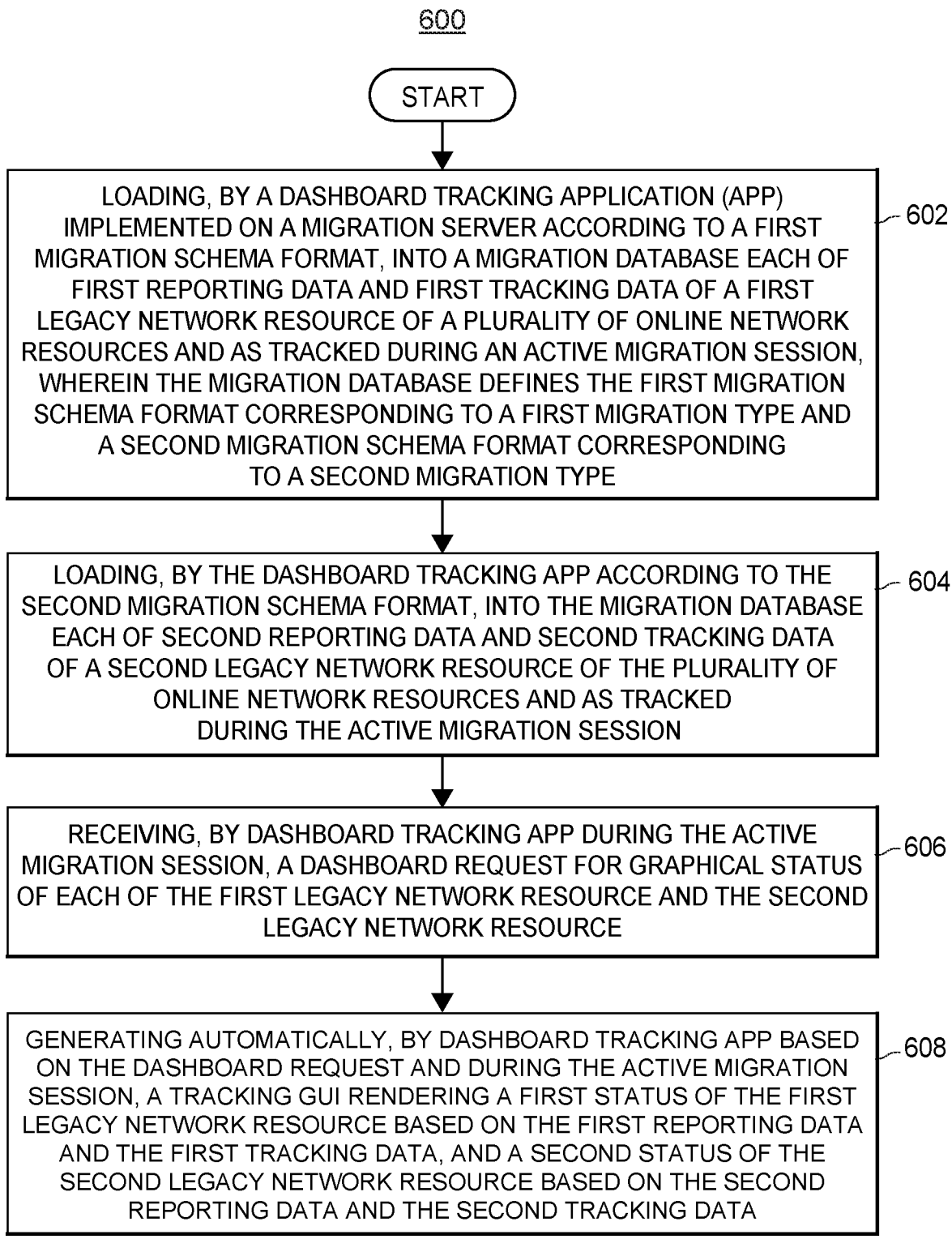
FIG. 6 illustrates an example automated migration method for generation of guided user interfaces (GUIs) for tracking migrating legacy networked resources within a computer network environment during a technical migration in accordance with various embodiments disclosed herein.

FIG. 6 illustrates an example automated migration method 600 or algorithm for generation of GUIs for tracking migrating legacy networked resources (e.g., legacy networked resources 121 to 123 and/or 131 to 133) within a computer network environment during a technical migration in accordance with various embodiments disclosed herein. In some embodiments, the GUIs may be implemented via view app 110 and/or app 104a1 as described for FIGS. 4A and 4B, herein.

With respect to FIG. 6, at block 602, the automated migration method 600 may include loading, by a dashboard tracking app (e.g., comprising app(s) 104a1, 104a2, and/or view app 110), implemented on a migration server (e.g., server(s) 102) according to a first migration schema format (e.g., migration schema formats 300 and/or 350), into a migration database (e.g., migration databases 106d1 and/or 106d2) each of first reporting data and first tracking data of a first legacy networked resource (e.g., mainframe 123) of a plurality of online network resources and as tracked during an active migration session.

In various embodiments, the migration database (e.g., migration databases 106d1 and/or 106d2) may define the first migration schema format corresponding to a first migration type and a second migration schema format corresponding to a second migration type. For example, first reporting data and first tracking data may include or be associated with the data described with respect to any one or more of predefined migration queries 200, database resource dependencies 250, network resource dependencies 280, migration schema formats 300 and/or 350 of FIGS. 2A to 2C and/or 3A and 3B, respectively, or other data or information as described herein. For example, the first reporting data and the first tracking data may be defined by a first migration schema.

At block 604, the automated migration method 600 may further include loading, by the dashboard tracking app (e.g., which may comprise app(s) 104a1, 104a2, and/or view app 110) according to the second migration schema format (e.g., migration schema formats 300 and/or 350), into the migration database (e.g., migration databases 106d1 and/or 106d2) each of second reporting data and second tracking data of a second legacy networked resource (e.g., mainframe 132) of the plurality of online network resources and as tracked during the active migration session. For example, first reporting data and first tracking data may include or be associated with the data described with respect to any one or more of predefined migration queries 200, database resource dependencies 250, network resource dependencies 280, migration schema formats 300 and/or 350 of FIGS. 2A to 2C and/or 3A and 3B, respectively, or other data or information as described herein. For example, the second reporting data and the second tracking data may be defined by a second migration schema.

In some embodiments, the first reporting data and the first tracking data may be based on a first set of network dependencies discovered on the computer network 115 of the first legacy networked resource (e.g., mainframe 123). For example, these can include any one or more of predefined migration queries 200, database resource dependencies 250, and/or network resource dependencies 280, of FIGS. 2A to 2C, respectively.

Similarly, the second reporting data and the second tracking data may be based on a second set of network dependencies discovered on the computer network of the second legacy networked resource (e.g., mainframe 132). For example, these can include any one or more of predefined migration queries 200, database resource dependencies 250, and/or network resource dependencies 280, of FIGS. 2A to 2C, respectively.

In additional embodiments, each of the first migration schema format, the first migration type, and the first legacy networked resource may be different from each of, or some of, the second migration schema format, the second migration type, and the second legacy networked resource. In other embodiments, any one or more of the schema formats, migration types, and/or network resource(s) may the same or similar, including having the same or similar data and/or types. For example, such migration formations or types can include or be associated with any one or more of migration schema formats 300 and/or 350 of FIGS. 3A and/or 3B, respectively.

In additional embodiments, the reporting and tracking may be loaded at different times during an active migration session. For example, in some embodiments, each of first reporting data and first tracking data may be loaded at a first time during the active migration session, where each of second reporting data and second tracking data may be loaded at a second time during the active migration session.

With respect to FIG. 6, at block 606, the automated migration method 600 may further include receiving, by dashboard tracking app (e.g., app(s) 104a1, 104a2, and/or view app 110) during the active migration session, a dashboard request for graphical status of each of the first legacy networked resource (e.g., mainframe 123) and the second legacy networked resource (e.g., mainframe 132).

At block 608, the automated migration method 600 may further include generating automatically, by the dashboard tracking app (e.g., app(s) 104a1, 104a2, and/or view app 110) based on the dashboard request and during the active migration session, a tracking GUI (e.g., tracking GUI 400) rendering a first of the first legacy networked resource based on the first reporting data and the first tracking data, and a second status of the second legacy networked resource based on the second reporting data and the second tracking data. For example, the statuses may include any one or more of statues of servers 412, server types 414, server count tracking information 422, and/or count by server type tracking information 424 as described herein for FIGS. 4A and 4B and tracking GUI 400.

In some embodiments, a dashboard request may be received at server(s) 102 which may trigger the dashboard tracking app (e.g., app(s) 104*a*1, 104*a*2, and/or view app 110) to update and re-render on the tracking GUI (e.g., tracking GUI 400) in real time or near real time each of the first reporting data and the first tracking data of the first legacy networked resource (e.g., mainframe 123) and the second reporting data and the second tracking data of the second legacy networked resource (e.g., mainframe 132) as described herein.

In still further embodiments, dashboard tracking app (e.g., app(s) 104*a*1, 104*a*2, and/or view app 110) may be further configured, during the active migration session, to load, during the active migration session and according to a target migration schema format (e.g., of WINDOWS 2018), into the migration database (e.g., database 106*d*1 and/or 106*d*2) each of target reporting data and target tracking data of a target migration network resource (e.g., for a server to install WINDOWS 2018) to be implemented on the computer network. A tracking GUI (e.g., tracking GUI 400) may further render a target status of the target migration network resource based on the target reporting data and the target tracking data. In such embodiments, a first legacy networked resource may include a legacy version of a specific network resource (e.g., a server implementing WINDOWS 2012 to be sunset), and the target migration network resource may be an updated version of the specific network resource (e.g., a server to have WINDOWS 2018 installed).

Additional Considerations

Although the disclosure herein sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location, while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other embodiments, the one or more processors or processor-implemented modules may be distributed across a number of geographic locations.

This detailed description is to be construed as exemplary only and does not describe every possible embodiment, as describing every possible embodiment would be impractical, if not impossible. A person of ordinary skill in the art may implement numerous alternate embodiments, using either current technology or technology developed after the filing date of this application.

Those of ordinary skill in the art will recognize that a wide variety of modifications, alterations, and combinations can be made with respect to the above described embodiments without departing from the scope of the invention, and that such modifications, alterations, and combinations are to be viewed as being within the ambit of the inventive concept.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

What is claimed is:

1. An automated migration system configured to generate guided user interfaces (GUIs) for tracking migrating legacy networked resources within a computer network environment during a technical migration, the automated migration system comprising:
   a migration database defining a first migration schema format corresponding to a first migration type and a second migration schema format corresponding to a second migration type, wherein the first migration schema format defines a first format of data required for migration of a first legacy networked resource identified by the first migration type, and wherein in the second migration schema format defines a second format of data required for migration of a second legacy networked resource identified by the second migration type;
   a migration server communicatively coupled to the migration database and to a computer network comprising a plurality of online network resources; and
   a dashboard tracking application (app) implemented on the migration server and configured, during an active migration session, to:
      load, according to the first migration schema format, into the migration database each of first reporting data and first tracking data of the first legacy networked resource of the plurality of online network resources and as tracked during the active migration session, load, according to the second migration schema format, into the migration database each of second reporting data and second tracking data of the second legacy networked resource of the plurality of online network resources and as tracked during the active migration session,
      receive, during the active migration session, a dashboard request for graphical status of each of the first legacy networked resource and the second legacy networked resource, and
      generate automatically, based on the dashboard request, a tracking GUI rendering a first status of the first legacy networked resource based on the first reporting data and the first tracking data, and a second status of the second legacy networked resource based on the second reporting data and the second tracking data.

2. The automated migration system of claim 1, wherein the dashboard tracking app is further configured, during the active migration session, to:
   load, during the active migration session and according to a target migration schema format, into the migration database each of target reporting data and target tracking data of a target migration network resource to be implemented on the computer network,
   wherein the tracking GUI further renders a target status of the target migration network resource based on the target reporting data and the target tracking data.

3. The automated migration system of claim 2, wherein first legacy networked resource comprises a legacy version of a specific network resource, and
   wherein the target migration network resource is an updated version of the specific network resource.

4. The automated migration system of claim 1, wherein each of the first migration schema format, the first migration type, and the first legacy networked resource is different from each of the second migration schema format, the second migration type, and the second legacy networked resource.

5. The automated migration system of claim 1, wherein the dashboard request triggers the dashboard tracking app to update and re-render on the tracking GUI in real time or near real time each of the first reporting data and the first tracking data of the first legacy networked resource and the second reporting data and the second tracking data of the second legacy networked resource.

6. The automated migration system of claim 1, wherein each of first reporting data and first tracking data is loaded at a first time during the active migration session.

7. The automated migration system of claim 6, wherein each of second reporting data and second tracking data is loaded at a second time during the active migration session.

8. The automated migration system of claim 1, wherein the first reporting data and the first tracking data is based on a first set of network dependencies discovered on the computer network of the first legacy networked resource, and
   wherein the second reporting data and the second tracking data is based on a second set of network dependencies discovered on the computer network of the second legacy networked resource.

9. The automated migration system of claim 1 further comprising a guided user interface (GUI) migration search screen, the GUI migration screen configured to receive a search request corresponding to the legacy networked resource and the migration type,
  wherein the search request causes the GUI migration search screen to a display editing interface for configuring a status of the first legacy networked resource corresponding to the first migration type or the second legacy networked resource corresponding to the second migration type.

10. The automated migration system of claim 1, wherein first reporting data and the first tracking data are defined by the first migration schema, and
  wherein second reporting data and the second tracking data are defined by the second migration schema.

11. The automated migration system of claim 1, wherein the tracking GUI is implemented as a web browser plugin configured to access the migration server on the computer network, and wherein the dashboard request originates from the web browser plugin.

12. A automated migration method for generating guided user interfaces (GUIs) for tracking migrating legacy networked resources within a computer network environment during a technical migration, the automated migration method comprising:
  loading, by a dashboard tracking application (app) implemented on a migration server according to a first migration schema format, into a migration database each of first reporting data and first tracking data of a first legacy networked resource of a plurality of online network resources and as tracked during an active migration session,
  wherein the migration database defines the first migration schema format corresponding to a first migration type and a second migration schema format corresponding to a second migration type, wherein the first migration schema format defines a first format of data required for migration of the first legacy networked resource identified by the first migration type, and wherein in the second migration schema format defines a second format of data required for migration of a second legacy networked resource identified by the second migration type;
  loading, by the dashboard tracking app according to the second migration schema format, into the migration database each of second reporting data and second tracking data of the second legacy networked resource of the plurality of online network resources and as tracked during the active migration session;
  receiving, by the dashboard tracking app during the active migration session, a dashboard request for graphical status of each of the first legacy networked resource and the second legacy networked resource; and
  generating automatically, by the dashboard tracking app based on the dashboard request and during the active migration session, a tracking GUI rendering a first status of the first legacy networked resource based on the first reporting data and the first tracking data, and a second status of the second legacy networked resource based on the second reporting data and the second tracking data.

13. The automated migration method of claim 12, wherein the dashboard tracking app is further configured, during the active migration session, to:
  load, during the active migration session and according to a target migration schema format, into the migration database each of target reporting data and target tracking data of a target migration network resource to be implemented on the computer network,
  wherein the tracking GUI further renders a target status of the target migration network resource based on the target reporting data and the target tracking data.

14. The automated migration method of claim 13, wherein first legacy networked resource comprises a legacy version of a specific network resource, and
  wherein the target migration network resource is an updated version of the specific network resource.

15. The automated migration method of claim 12, wherein each of the first migration schema format, the first migration type, and the first legacy networked resource is different from each of the second migration schema format, the second migration type, and the second legacy networked resource.

16. The automated migration method of claim 12, wherein the dashboard request triggers the dashboard tracking app to update and re-render on the tracking GUI in real time or near real time each of the first reporting data and the first tracking data of the first legacy networked resource and the second reporting data and the second tracking data of the second legacy networked resource.

17. The automated migration method of claim 12, wherein each of first reporting data and first tracking data is loaded at a first time during the active migration session.

18. The automated migration method of claim 17, wherein each of second reporting data and second tracking data is loaded at a second time during the active migration session.

19. The automated migration method of claim 12, wherein the first reporting data and the first tracking data is based on a first set of network dependencies discovered on the computer network of the first legacy networked resource, and
  wherein the second reporting data and the second tracking data is based on a second set of network dependencies discovered on the computer network of the second legacy networked resource.

20. A tangible, non-transitory computer-readable medium storing instructions for generating guided user interfaces (GUIs) for tracking migrating legacy networked resources within a computer network environment during a technical migration, that when executed by one or more processors of a migration server causes the one or more processors of the migration server to:
  load, by a dashboard tracking application (app) implemented on the migration server according to a first migration schema format, into a migration database each of first reporting data and first tracking data of a first legacy networked resource of a plurality of online network resources and as tracked during an active migration session,
  wherein the migration database defines the first migration schema format corresponding to a first migration type and a second migration schema format corresponding to a second migration type, wherein the first migration schema format defines a first format of data required for migration of the first legacy networked resource identified by the first migration type, and wherein in the second migration schema format defines a second format of data required for migration of a second legacy networked resource identified by the second migration type;
  load, by the dashboard tracking app according to the second migration schema format, into the migration database each of second reporting data and second tracking data of the second legacy networked resource of the plurality of online network resources and as tracked during the active migration session;

receive, by the dashboard tracking app during the active migration session, a dashboard request for graphical status of each of the first legacy networked resource and the second legacy networked resource; and generate automatically, by the dashboard tracking app based on the dashboard request and during the active migration session, a tracking GUI rendering a first status of the first legacy networked resource based on the first reporting data and the first tracking data, and a second status of the second legacy networked resource based on the second reporting data and the second tracking data.

\* \* \* \* \*